United States Patent [19]

Saruwatari et al.

[11] Patent Number: 5,112,557
[45] Date of Patent: May 12, 1992

[54] PROCESS FOR PREPARING A POLYIMIDE MOLDED FORM

[75] Inventors: Masumi Saruwatari; Yasuhiko Ohta; Yasuhiro Fujii; Yasuko Honji, all of Aichi, Japan

[73] Assignee: Mitsui Toatsu Chemicals, Inc., Tokyo, Japan

[21] Appl. No.: 576,215

[22] Filed: Aug. 31, 1990

[30] Foreign Application Priority Data

Sep. 16, 1989 [JP] Japan ................................. 1-238399

[51] Int. Cl.$^5$ ............................................. B29C 55/00
[52] U.S. Cl. ................................ 264/289.3; 264/289.6; 264/290.2; 264/290.5; 264/291
[58] Field of Search ............... 264/289.3, 210.8, 210.1, 264/211.13, 211.14, 184, 205, 290.5, 289.6, 290.2, 291

[56] References Cited

U.S. PATENT DOCUMENTS 3,415,782  12/1968  Irwin et al. .......................... 264/205
4,405,550   9/1983  Hungerford ......................... 264/216

Primary Examiner—Hubert C. Lorin
Attorney, Agent, or Firm—Burns, Doane, Swecker & Mathis

[57] ABSTRACT

A process for the preparation of a polyimide molded form comprising the steps of swelling a primary-molded form consisting essentially of polyimide having recurring units of the formula (I)

[Structural formula (I)]

by using an aprotic polar solvent and subsequently stretching the swelled form.

14 Claims, No Drawings

PROCESS FOR PREPARING A POLYIMIDE MOLDED FORM

BACKGROUND OF THE INVENTION

1. Field of the Invention

The present invention relates to a process for preparing a molded form of oriented polyimide essentially consisting of a specific polyimide.

2. Description of the Related Art

In order to obtain oriented polyimide forms by stretching primary molded forms such as fibers, films, sheets and bars which are consisting of thermoplastic polyimide, it is required in a stretching step to maintain the primary-molded forms and stretching equipment at high temperatures, for example, from 250° to 400° C. Particularly in the case of stretching a specific polyimide of the present invention having a glass transition temperature of about 250° C. and a melting point of about 380° C., the resin is required to maintain the temperature at least its glass transition temperature. The equipment for molding at such temperature is very difficult to uniformly heat. Further, complete heat-insulation of the stretching equipment is difficult and it is unfavorable in economy to uniformly maintain high temperatures for a long time. Stretching can also be conducted at temperatures below the glass transition point. However, breakage of molecular chains and microvoids unfavorably occur.

SUMMARY OF THE INVENTION

An object of the present invention is to provide a process capable of stretching a molded form of heat-resistant polyimide at much lower temperatures so as to steadily and efficiently prepare an oriented polyimide form having thermal and mechanical properties equivalent or superior to those of a stretched form obtained by stretching at high temperatures.

As a result of carrying out an intensive investigation in order to achieve the above object, the present inventors have found that stretching ca be uniformly carried out at much lower temperatures by swelling a primary-molded form with a specific solvent prior to stretching. Thus the invention has been completed.

One aspect of the present invention is a process for the preparation of a polyimide molded form comprising the steps of swelling a primary-molded form consisting essentially of polyimide having recurring units of the formula (I):

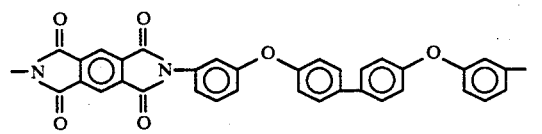

by using an aprotic polar solvent and subsequently stretching the swelled form.

The process of preparing the polyimide molded form of the present invention enables heat-resistant polyimide to be stretched at much lower temperatures and can also provide a process for steadily and efficiently preparing the stretched polyimide form having thermal and mechanical properties equivalent or superior to those of the form stretched at high temperatures.

DESCRIPTION OF THE PREFERRED EMBODIMENTS

The polyimide used for the invention has recurring units illustrated by the above formula [I]. Such type of polyimide can be prepared by conducting a polymerization reaction of pyromellitic dianhydride (hereinafter referred to as acid anhydride) with 4,4'-bis(3-aminophenoxy)biphenyl (hereinafter referred to as diamine) to obtain polyamic acid having the formula (II):

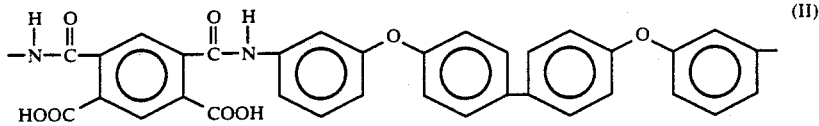

and imidizing the polyamic acid.

The polyimide used in the present invention preferably contains 95 mol % or more of the above acid anhydride and diamine, respectively.

When the polyimide contains 5 mol % or more of acid anhydride and diamine other than mentioned above, swelling by the solvent is insufficient and the primary-molded form unfavorably generates cracks in the stretching step or becomes brittle.

The polyimide used has a specific viscosity of preferably at least 0.3. Specific viscosity is measured at 23° C. with an Ubbelohde viscometer after dissolving the polyimide in a 90:10 by volume mixture of p-chlorophenol and phenol into a concentration of 0.5 g/dl. When the specific viscosity is less than 0.3, entanglement of molecular chain is extremely low and leads to breakage in the stretching step, low mechanical strength of the oriented form obtained and other unfavorable problems.

The primary-molded form of polyimide used in the present invention has a crystallinity of 10 % or less, preferably 5 % or less.

When the crystallinity exceeds 10 %, the primary-molded form unfavorably becomes difficult to swell in the aprotic polar solvent.

The primary-molded form can be prepared by extruding the polyimide of the above formula (I) into the form of a film, sheet, fiber or a bar and successively quenching the extrudate with air, water or rolls so as to restrict progress of crystallization.

The primary-molded polyimide form thus obtained can swell in the aprotic polar solvent.

Examples of preferred aprotic polar solvents which can be used for the present invention are halogenated solvents, amide based solvents, sulfone based solvents and phosphate based solvents which have no free hydrogen such as alcohol group, amine group and carboxyl group. Exemplary solvents include dichloromethane, trichloromethane, dichloroethanes, trichloroethanes, tetrachloroethanes, chloroethylene, dichloroethylenes, trichloroethylenes, N,N-dimethylformamide, N,N-dimethylacetamide, tetramethylurea, 1,3-dimethyl-2-imidazolidinone, N-methylpyrrolidone, dimethylsulfoxide, sulfolane and hexamethylphosphorictriamide. The aprotic polar solvent can be used singly or as a mixture and may contain other solvents.

The primary-molded form is swelled by the above aprotic polar solvent preferably to a degree of swelling of 10 to 150 wt %, more preferably 40 to 120 wt %. The temperature and time required for swelling the form to the above degree are different depending upon the aprotic polar solvent used. The temperature and time also vary depending upon the shape of the primary-molded form. The range of temperature is from room temperature to less than the boiling point of the aprotic polar solvent. The range of time is the period required for achieving the preferred degree of swelling mentioned above and is generally from 1 second to 24 hours.

When the temperature of the aprotic polar solvent is too high, microcracks are unfavorably generated in the primary-molded form although a high degree of swelling can be achieved within a short time. On the other hand, when the temperature of the aprotic polar solvent is too low, too a long time is undesirably required for swelling and further solvent cracking is unfavorably generated depending upon the kind of solvent.

The primary-molded polyimide form of the above formula [I] which has been swelled with the aprotic polar solvent is stretched from 1.1 to 10 times in the aprotic polar solvent or air in the temperature range of room temperature to a temperature lower than boiling point of the aprotic polar solvent, preferably at the same temperature that swelling has been conducted.

The oriented polyimide form can be prepared by conventional techniques, for example, a method for stretching with a group of rolls two and more, a center or pressure rolls, or a stretching method by drawing the form through a slit.

A swelled fibrous form is monoaxially oriented by stretching 1.1 to 10 times in the aprotic polar solvent or air in the temperature range of room temperature to a temperature lower than the boiling point of the swelling solvent, preferably at the swelling temperature by using a combination of the above preparation method of the stretched form.

A swelled film or sheet form is stretched in the aprotic polar solvent or air in the temperature range of room temperature to a temperature lower than the boiling point of the swelling solvent, preferably at the swelling temperature by using a combination of the above preparation method of the stretched form. Thus uniaxially stretched film and sheet which are uniaxially oriented, or biaxially stretched film and sheet which are biaxially oriented ca be obtained.

Stretching magnification of uniaxially stretched film and sheet is desirably from 1.1 to 7.0 times.

Stretching magnification of biaxially stretched film and sheet is desirably from 1.1 to 10.0 times by are ratio.

Stretching can also be carried out satisfactorily at room temperature. However, at lower temperatures than above, tearing or breakage is unfavorably liable to occur. When stretching is conducted at temperatures above the boiling point of the aprotic polar solvent, stretching becomes difficult due to rapid evaporation of the swelling solvent.

Preferred rate of stretching is in the range of 1 to 100000 min.

In order to remove the solvent from the stretched form and additionally to increase density and improve dimensional stability and mechanical properties, the stretched form is heat treated to give the oriented form of polyimide having the above formula (I).

The swelling solvent is removed by a wet method or a dry method. The wet method extracts the swelling solvent by using water or alcohol. The dry method evaporates the swelling solvent to dryness under atmospheric or reduced pressure. These methods can also be carried out in combination. In removing the swelling solvent, the stretched form is favorably fixed with tension or under shrinkage restriction. However, fixing of the stretched form is not always necessary. The removing temperature of the swelling solvent is preferably from room temperature to lower than the boiling point of the swelling solvent. Solvent removal below room temperature is unfavorable because too long time is required. When the swelling solvent is removed above its boiling point, rapid vaporization of the solvent leads to unfavorable generation of microvoids in the stretched form. In the dry method, it should be noted that the boiling point of the solvent changes by the effect of atmospheric pressure and by pressure increasing or reducing procedure in the solvent removal.

As mentioned above, use of the swelling solvent in stretching the primary-molded form can readily provide the oriented polyimide form having thermal and mechanical properties equivalent or superior to those of conventional forms stretched at high temperatures.

The present invention will hereinafter be illustrated by way of examples.

EXAMPLE 1 AND COMPARATIVE EXAMPLE 1

To a reaction vessel equipped with a stirrer, reflux condenser and a nitrogen inlet tube, 368.4 g (1 mole of 4,4'-bis(3-aminophenoxy)biphenyl and 2500 g of N,N-dimethylacetamide were charged and 213.7 g (0.98 mole) of pyromellitic dianhydride was added by portions in a nitrogen atmosphere with caution to prevent a temperature rise of the solution. Further, 5.92 g (0.04 mole) of phthalic anhydride was added and stirred for about 20 hours at room temperature. Thereafter 30.3 g (0.3 mole) of triethylamine and 30.6 g (0.3 mole) of acetic anhydride were added over about 30 minutes and stirred for 30 minutes. To the resulting solution, 2500 g of methanol was charged and precipitated polyimide powder was filtered at 30° C. The polyimide powder obtained was washed with methanol and acetone and dried at 300° C. for 8 hours in a nitrogen atmosphere to obtain 510 g (yield 93 %) of polyimide powder.

Polyimide powder thus obtained was dried at 180° C. for 24 hours, melted at 400° C. in a 25 mm vented extruder, delivered through a nozzle of 2 mm in diameter and cooled in water to obtain a strand having a diameter of 1.8 mm.

The strand was cut into pieces having a length of about 100 mm and used as a specimen for stretching test of the strand. According to a wide angle X-ray diffraction analysis of the specimen, the strand had no peak which is assigned to crystallinity and was determined to be amorphous.

The strand had a specific viscosity of 0.453.

1,3-Dimethyl-2-imidazolidinone (DMI) which is an aprotic polar solvent was used as a swelling solvent in Example 1 and toluene was used as a reference solvent in Comparative Example 1. The strand specimen was swelled by using the temperature and time illustrated in Table 1.

The swelled specimen was set on a tensile tester equipped with a thermostat and stretched at the swelling temperature at a rate of 500 %/min with a stretching magnification illustrated in Table 1. The resulting specimen was fixed at both ends, submerged in ethanol at 40° C. to extract the swelling solvent, and heat-treated at 300° C. for 30 minutes to obtain a fibrous specimen. Elastic modulus was measured on the fibrous specimen in accordance with ASTM D-882. Results are illustrated in Table 1.

COMPARATIVE EXAMPLE 2

An amorphous strand was prepared by carrying out the same procedures as described in Example 1 except that the aprotic polar solvent was omitted. The strand obtained was stretched under the conditions illustrated in Table 1 at a stretching rate of 500 %/min and heat-treated at 300° C. for 30 minutes to obtain a fibrous specimen. Elastic modulus was measured on the fibrous specimen. Results are illustrated in Table 1.

EXAMPLE 2 AND COMPARATIVE EXAMPLE 3

Polyimide powder was prepared by carrying out the same procedures at described in Example 1. The polyimide powder was dried at 180° C. for 24 hours, melted at 400° C. in a 25 mm vented extruder, delivered through a nozzle of 2 mm in diameter, and allowed to cool in the air to obtain a strand having a diameter of 1.8 mm. The strand was cut into pellets having a length of about 3 mm.

The pellets were dried at 180° C. for 24 hours, charged to a 25 mm vented extruder, heat-melted at 400° C., delivered through a slit die having a width of 150 mm and a gap of 1.0 mm, and taken up with a roll having a temperature of 220° C. obtain a film having a thickness of about 0.5 mm. According to a wide angle X-ray diffraction analysis on the film thus obtained, a peak assigned to crystallinity was not found and the film was determined to be amorphous. The film had a specific viscosity of 0.451.

1,3-Dimethyl-2-imidazolidinone(DMI) which is an aprotic polar solvent was used as a swelling solvent in Example 2 and toluene was used as a reference solvent in Comparative Example 3. The film was swelled under the conditions illustrated in Table 1. The swelled film was set on a tensile tester equipped with a thermostat and stretched at the swelling temperature at a rate of 500 %/min with a stretching magnification illustrated in Table 1. The resulting film was fixed at both ends, submerged in ethanol at 40° C. to extract the swelling solvent, and heat-treated at 300° C. for 30 minutes to obtain a uniaxially stretched film with a free width. Elastic modulus was measured on the uniaxially stretched film. Results ar illustrated in Table 1.

COMPARATIVE EXAMPLE 4

An amorphous film was prepared by carrying out the same procedures as described in Example 2 except that the aprotic polar solvent was omitted. The film was stretched under the conditions illustrated in Table 1 at a stretching rate of 500 %/min and heat-treated at 300° C. for 30 minutes to obtain a un film with a free width. Elastic modulus was measured on the uniaxially stretched film obtained. Results are illustrated in Table 1.

EXAMPLE 3 AND COMPARATIVE EXAMPLE 5

An amorphous film was prepared by carrying out the same procedures as described in Example 2.

1,3 Dimethyl-2-imidazolidinone (DMI) which is a aprotic polar solvent was used as a swelling solvent in Example 3 and toluene was used as a reference solvent in Comparative Example 5. The film was swelled under the conditions illustrated in Table 1. The swelled film was set on a film stretcher (a product of Toyo Seiki Co. Ltd.), and a successive and biaxial stretching was carried out with a stretching magnification illustrated in Table 1. The resulting film was fixed on four sides, submerged in ethanol at 40° C. to extract the swelling solvent, and heat-treated at 300° C. for 30 minutes to obtain a biaxially stretched film. Elastic modulus was measured on the biaxially stretched film. Results are illustrated in Table 1.

COMPARATIVE EXAMPLE 6

An amorphous film was prepared by carrying out the same procedures as described in Example 2 except that the aprotic polar solvent was omitted. Successive and biaxial stretching was carried out on the film at 280° C. at a stretching rate of 500 %/min with a stretching magnification illustrated in Table 1. The resulting film was heat-treated at 300° C. for 30 minutes to obtain a biaxially stretched film. Elastic modulus was measured on the film thus obtained. Results are illustrated in Table 1.

EXAMPLES 4 to 6

Amorphous strand specimens as used in Example 1 were swelled with solvents and under conditions illustrated in Table 1, stretched and heat-treated by the same procedures as described in Example 1. Stretching ability was good in any Example. Results are illustrated in Table 1.

TABLE 1

| | Swelling | | | | Stretching | | | Elastic modulus | | |
| --- | --- | --- | --- | --- | --- | --- | --- | --- | --- | --- |
| | Solvent | Temperature (°C.) | Time (min) | Degree (%) | Temperature (°C.) | Magnification MD | TD | MD (kg/mm²) | TD (kg/mm²) | Remarks |
| Example 1 | DMI | 60 | 60 | 95 | 60 | 6 | — | 1105 | — | good stretching |
| Example 2 | DMI | 60 | 60 | 95 | 60 | 4 | — | 900 | — | " |
| Example 3 | DMI | 60 | 60 | 95 | 60 | 3 | 3 | 855 | 905 | " |
| Example 4 | DCM | 25 | 200 | 60 | 30 | 2 | — | 600 | — | " |
| Example 5 | TCE | 60 | 120 | 48 | 60 | 2 | — | 650 | — | " |
| Example 6 | DMF | 100 | 60 | 72 | 100 | 2 | — | 620 | — | " |
| Comparat. Example 1 | Toluene | 60 | 60 | 0.01 | 60 | — | — | — | — | Poor stretching ability |
| Comparat. Example 2 | — | — | — | — | 280 | 6 | — | 1050 | — | Poor stretching ability |
| Comparat. Example 3 | Toluene | 60 | 60 | 0.01 | 60 | — | — | — | — | Poor stretching ability |
| Comparat. Example 4 | — | — | — | — | 280 | 4 | — | 900 | — | Poor stretching ability |
| Comparat. Example 5 | Toluene | 60 | 60 | 0.01 | 60 | — | — | — | — | Poor stretching ability |
| Comparat. | — | — | — | — | 280 | 3 | 3 | 770 | 880 | Poor stretching |

TABLE 1-continued

| | Swelling | | | Stretching | | | Elastic modulus | | |
|---|---|---|---|---|---|---|---|---|---|
| Solvent | Temperature (°C.) | Time (min) | Degree (%) | Temperature (°C.) | Magnification MD | TD | MD (kg/mm$^2$) | TD (kg/mm$^2$) | Remarks |
| Example 6 | | | | | | | | | ability |

(Note)
DMI: 1,3-Dimethyl-2-imidazolidinone
DCM: Dichloromethane
TCE: 1,1,1-Trichloroethane
DMF: N,N-Dimethylformamide
MD: machine direction
TD: transverse direction

What is claimed is:

1. A process for preparing a polyimide molded form comprising the steps of selling a primary molded form essentially consisting of polyimide having recurring units represented by the formula (I):

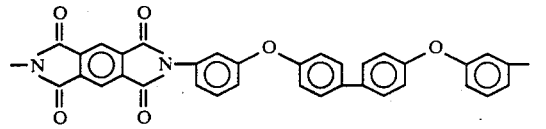

to a degree of swelling of 10 to 150% in an aprotic polar solvent and successively stretching the swelled form 1.1 to 10 times in a temperature range of from room temperature to less than the boiling point of the aprotic polar solvent.

2. The process of claim 1 wherein the primary-molded form is a film.

3. The process of claim 1 wherein the primary-molded form is a filament.

4. The process of claim 1 wherein the primary-molded form is a sheet.

5. A process for preparing the polyimide molded form of claim 2 wherein the film is uniaxially stretched 1.1 to 7.0 times in the aprotic polar solvent.

6. The process for preparing the polyimide molded form of claim 2 wherein the film is uniaxially stretched 1.0 to 7.0 times in air.

7. The process for preparing the polyimide molded form of claim 2 wherein the film is biaxially stretched 1.1 to 10.0 times by area in the aprotic polar solvent.

8. The process for preparing the polyimide molded form of claim 2 wherein the film is biaxially stretched 1.1 to 10 times by area in air.

9. The process for preparing the polyimide molded form of claim 3 wherein the filament is uniaxially stretched 1.1 to 10.0 times in the aprotic polar solvent.

10. The process for preparing the polyimide molded form of claim 3 wherein the filament is uniaxially streteched 1.1 to 10.0 times in air.

11. The process for preparing the polyimide molded form of claim 4 wherein the sheet is uniaxially stretched 1.1 to 7.0 times in the aprotic polar solvent.

12. The process for preparing the polyimide molded form of claim 4 wherein the sheet is uniaxially stretched 1.1 to 7.0 times in air.

13. The process for preparing the polyimide molded form of claim 4 wherein the sheet is biaxially stretched 1.1 to 10.0 times by the area in the aprotic polar solvent.

14. The process for preparing the polyimide molded form of claim 4 wherein the sheet is biaxially stretched 1.1 to 10.0 times by area in air.

* * * * *

UNITED STATES PATENT AND TRADEMARK OFFICE
CERTIFICATE OF CORRECTION

PATENT NO. : 5,112,557

DATED : May 12, 1992

INVENTOR(S) : Saruwatari et al.

It is certified that error appears in the above-identified patent and that said Letters Patent is hereby corrected as shown below:

Col. 7, line 17, delete "selling" and insert therefor --swelling--.

Signed and Sealed this

Twenty-first Day of September, 1993

Attest:

BRUCE LEHMAN

*Attesting Officer*     *Commissioner of Patents and Trademarks*